(12) United States Patent
Martin et al.

(10) Patent No.: US 6,345,804 B1
(45) Date of Patent: Feb. 12, 2002

(54) CONTROL VALVE FOR FUEL INJECTION DEVICES FOR INTERNAL COMBUSTION ENGINES

(75) Inventors: Steffen Martin, Niederfrohna; Martin Lenk, Chemnitz; Bernd Niethammer, Nürtingen, all of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/450,517

(22) Filed: Nov. 29, 1999

(30) Foreign Application Priority Data

Apr. 14, 1999 (DE) .......................... 199 16 658

(51) Int. Cl.$^7$ .............................. F16K 31/02
(52) U.S. Cl. .................. 251/129.15; 137/625.65; 251/285
(58) Field of Search ............... 251/129.15, 129.18, 251/285; 137/625.65, 284

(56) References Cited

U.S. PATENT DOCUMENTS

| | | | | |
|---|---|---|---|---|
| 2,587,538 A | * | 2/1952 | Seaman ................. | 251/129.18 |
| 3,429,552 A | * | 2/1969 | Huley et al. ......... | 251/129.18 X |
| 4,396,037 A | * | 8/1983 | Wilcox ................ | 251/129.1 X |
| 4,614,328 A | * | 9/1986 | Zeadman et al. ... | 251/129.18 X |
| 4,619,239 A | * | 10/1986 | Wallenfang et al. . | 251/129.1 X |
| 4,741,365 A | * | 5/1988 | Van Ornum ....... | 251/129.21 X |
| 4,884,720 A | * | 12/1989 | Whigham et al. .. | 251/129.18 X |
| 5,598,871 A | * | 2/1997 | Sturman et al. ..... | 251/129.1 X |
| 5,640,987 A | * | 6/1997 | Sturman ............. | 251/129.1 X |
| 5,700,136 A | * | 12/1997 | Sturman ............. | 137/487.5 X |
| 5,829,396 A | * | 11/1998 | Sturman et al. ..... | 251/129.1 X |
| 5,964,406 A | * | 10/1999 | Zuo ................... | 251/129.1 X |
| 5,992,821 A | * | 11/1999 | Rookes et al. ........... | 251/129.1 |

* cited by examiner

*Primary Examiner*—Kevin Shaver
*Assistant Examiner*—John Bastianelli
(74) *Attorney, Agent, or Firm*—R. W. Becker & Associates; R. W. Becker

(57) ABSTRACT

The present invention relates to a control valve, especially for fuel injection devices for internal combustion engines, preferably diesel engines, with a valve housing within which at least one piston is displaceable and which comprises stops for the piston, wherein at least one of the stops is axially displaceable.

11 Claims, 5 Drawing Sheets

CONTROL VALVE FOR FUEL INJECTION DEVICES FOR INTERNAL COMBUSTION ENGINES

BACKGROUND OF THE INVENTION

The present invention relates to a control valve for fuel injection devices for internal combustion engines, preferably Diesel engines, with a valve housing within which at least one piston is displaceable and which comprises stops for the piston.

Today's internal combustion engines, Diesel engines, in particular, require an injection process consisting of several individual injection actions for a reliable and clean mixture formation within the combustion chamber of the engine. These injection processes are divided into one or more pre-injections, a main injection and, perhaps one or more subsequent injections of the fuel. For producing the pre-injection fuel quantity, a control unit is employed which requires a high-cost electronic control system and which shows energy losses. Frequently, a damper is employed for producing the pre-injection fuel quantity. This damper, however, cannot be fully utilized in each step of the operation and shows severe deviating depending on the operational location. The reason for this is that the switching time of the control hydraulic is too long in the event of small injection quantities due to the design of the control elements and a small pre-injection quantity can, therefore, be produced only with the help of a significant control-technical structural design and expenditure.

Therefore, it is an object of the present invention to provide a control valve of the aforementioned kind such that a small pre-injection quantity of fuel can be produced at all operational locations without a high control-technical structural design and expenditure

SUMMARY OF THE INVENTION

This object is solved by the inventive control valve by providing at least one of the stops to be axially adjustable.

With the inventive control valve, at least one of the stops for the piston is axially displaceable. This determines the stroke of the piston and the time period in the respective end positions corresponding to the closed or opened up control valve. Because of the possibility to adjust the stop, the piston stroke can be varied, depending on what the requirements are. Thereby, the smallest injection quantities, particularly for the pre-injection, and, if necessary, also for a subsequent injection, can be precisely controlled in a simple way without negatively affecting the main injection. It is also possible to reduce leakage losses by correspondingly adjusting the position of the stop.

BRIEF DESCRIPTION OF THE DRAWINGS

The object and advantages of the present invention will appear more clearly from the following specification in conjunction with the accompanying schematic drawings in which:

FIG. 4 to

DESCRIPTION OF PREFERRED EMBODIMENTS

Figure 1:
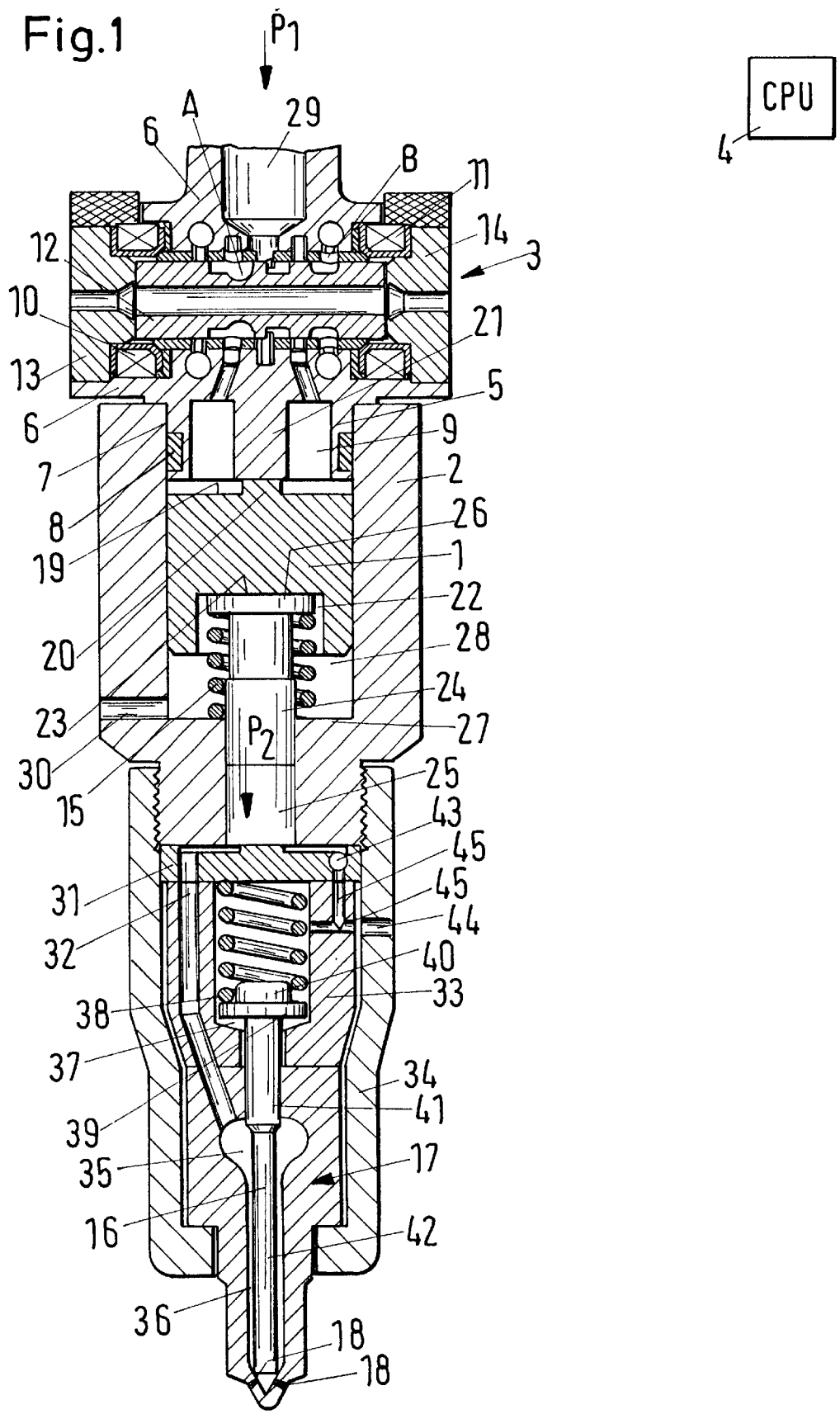
FIG. 1 shows a longitudinal section of a injection device with an inventive control valve.

The present invention will now be described in detail with the aid of several specific embodiments utilizing FIGS. 1 through 8.

The fuel injection device is utilized in motor vehicles and its purpose is to supply fuel to an internal combustion engine, a Diesel engine, in particular. The fuel injection device has a control piston 1 which is provided in a housing 2. The pressure medium is supplied to the control piston 1 by a control valve 3 which is connected to a control unit 4. The control valve 3 is disposed on the housing 2 and projects with a projection 5 of a valve housing/valve body 6 into a recess 7 provided at the end face of the housing 2. At least one annular seal 8 is provided at the external wall of the projection 5 and seals the projection 5 against the housing 2. An annular cavity 9 is provided within the projection 5 and is line-connected to working connections A, B of the control valve 3. The control valve 3 is controlled and monitored by the control unit 4. Coils 10, 11 of the control valve 3 can be supplied with current by means of the control unit 4. A piston 12 of the control valve 3 is embodied as an anchor and can be displaced by the coils 10, 11 in the desired direction. The piston 12 is axially displaceable between two stops 13, 14 which are inserted into the end faces of the valve body 6.

If the control valve 3 is closed, the control piston 1 abuts the projection 5 of the valve body 6 under the force of a compression spring 15. FIG. 1 shows the control piston 1 in its starting position, displaced by the spring 15, in which an injection valve body 16 of an injection valve 17 closes off nozzle openings 18 by means of which the fuel is fed to the combustion chamber of the internal combustion engine (not illustrated).

The control piston 1 is provided with a piston surface 19 which is acted upon by the system pressure $p_1$. A central projection 20 is provided in the piston surface 19. In the starting position, the control piston 1 abuts with the central projection 20 an axial central projection 21 the projection 5.

At its opposite end, the control piston 1 is provided with a recess bore 22 at the bottom surface 23 of which a pressure transferring or intensifying piston 24 abuts. The pressure intensifying piston 24 has a smaller diameter than the control piston 1 and projects into a bore 25 of the housing 2. The system pressure $p_1$ is intensified by the pressure intensifying piston 24 creating the larger pressure $p_2$ which acts on the injection valve 17.

The compression spring 15 abuts the bottom surface of a shoulder 26 at an end of the pressure intensifying piston 24. The compression spring 15 surrounds the pressure intensifying piston 24 and abuts with its other end the bottom 27 of a bore hole 28 of the housing 2, whereby this bore hole 28 receives the control piston 1.

When the internal combustion engine is operated the piston 12 of the control valve 3 is displaced by means of the control unit 4 that provides current to the coil 11 such that the hydraulic medium which is fed by a line 29 within the valve body 6 is pressurized. The hydraulic medium reaches the annular cavity 9 and acts with the system pressure $p_1$ upon the piston surface 19 of the control piston 1. The recess bore 22 positioned opposite the piston surface 19 is relieved of pressure and is connected to the atmosphere by a bore opening 30 penetrating the housing 2. Due to this design, the control piston 1 can be displaced against the force of the compression spring 15 by the system pressure p1. Thereby, the pressure intensifying piston 24 abutting the bottom surface 23 of the recess bore 22 is also displaced whereby the fuel within the bore 25 is pressed into a bore channel 32 by a fixedly connected distribution plate 31. The bore channel 32 is provided within an insertion member 33 which is received by a threaded socket member 34. The threaded socket member 34 is screwed onto the housing 2 and receives the injection valve 17 which projects out of the threaded socket member 34. The distribution plate 31 is clamped by means of the threaded socket member 34 between the insertion member 33 and the housing 2. The threaded socket member 34 extends under the insertion member 33 so that the insertion member 33 is pressed in the direction of the housing 2 when the threaded socket member 34 is screwed on.

The bore channel 32 extends from the distribution plate 31 through the insertion member 33 to an injection chamber 35 which is provided within the insertion member 33 and which is penetrated by the injection valve body 16. An axial bore 36 is provided, adjoining the injection chamber 35 and leading to the nozzle openings 18. The axial bore 36 has a larger diameter than the portion of the injection valve body 16 which projects into the axial bore 36. The injection valve body 16 projects into a central receiving cavity 37 of the insertion member 33. The central receiving cavity 37 is closed off at the opposite side by the distribution plate 31. One end of a second compression spring 38 is supported on the distribution plate 31 and its other end rests on a shoulder member 39. The shoulder member 39 is provided at the end portion of the injection valve body 16 that is positioned within the central receiving cavity 37 and the shoulder member 39 has a central projection 40 for centering the second compression spring 38. The injection valve body 16 is axially guided with an enlarged portion 41 within the injection valve 17 and projects with this enlarged portion 41 into the injection chamber 35. Within the injection chamber 35 the enlarged portion 41 goes over into a thinner end portion 42.

The fuel reaching the injection chamber 35 by passing through the bore channel 32 exerts pressure upon the enlarged valve portion 41, whereby the injection valve body 16 is pushed back against the force of the second compression spring 38. The nozzle openings 18 are thus released from the injection valve body 16 so that the fuel can enter the combustion chamber.

Subsequent to the injection process, the piston 12 is displaced by activating the control valve 3 by means of the control unit 4, in such a way as to relieve the pressure in the annular cavity 9 into the tank. A back pressure valve 43 provided within the distribution plate 31 is opened up by the low pressure that is created on the return stroke of the pistons 1, 24, whereby fuel is taken in from a fuel container (not illustrated) through an opening 44 within the threaded socket member 34 and through an adjoining channel 45 within the insertion member 33. The fuel reaches the bore 25 via the distribution plate 31 so that the fuel can be conveyed to the nozzle openings 18 during the next stroke of the pressure intensifying piston 24 in the manner described. The channel 45 also opens into the central receiving cavity 37 of the insertion member 33.

When the piston 12 of the control valve rests against the stop 13, the two working connections A, B of the control valve 3 are separated from the line 29 by the piston 12. The piston 12 takes this position when the two pistons 1, 24 are pushed back into the starting position illustrated in FIG. 1 by the spring force in the described manner. The hydraulic medium in the annular cavity 9 is pushed toward the tank connection T via the line connecting the annular cavity 9 and the tank connection T, as is indicated by the flow arrows in FIG. 2. When the injection process takes place, the piston 12 is displaced to such an extent that it rests against the opposite stop 14. In this position, the working connections A, B are connected to the line 29 while the tank connection T is separated from the bores leading into the annular cavity 9. Thereby, the hydraulic medium can enter the annular cavity 9 via the working connections A, B and the bores.

Figure 2:
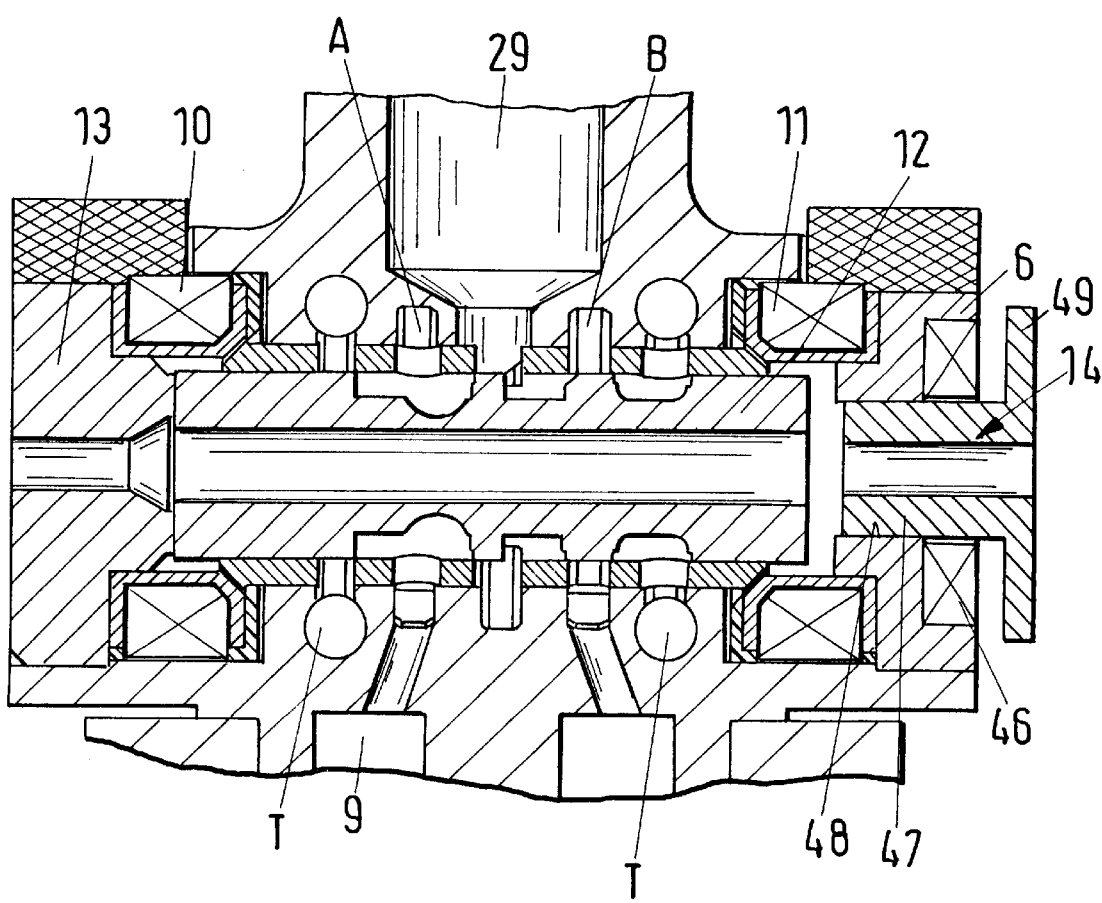
FIG. 2.
Figure 3:
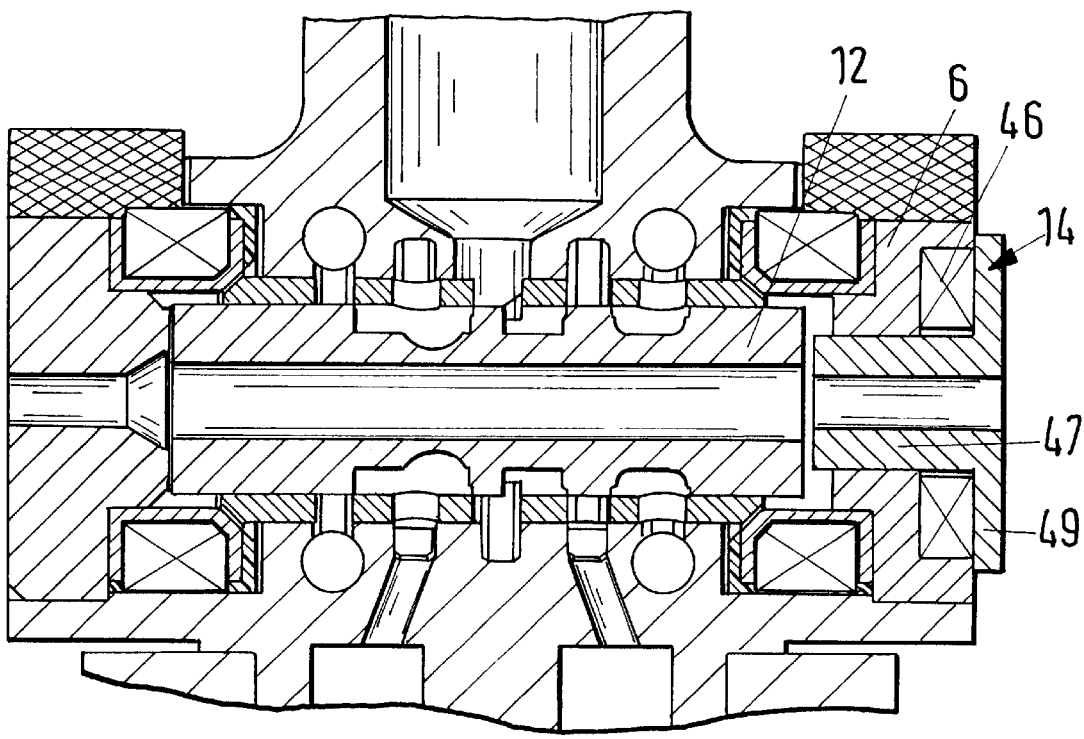
FIG. 3 show an enlarged view of a longitudinal section of the inventive control valve at various valve lift positions.
Figure 4:
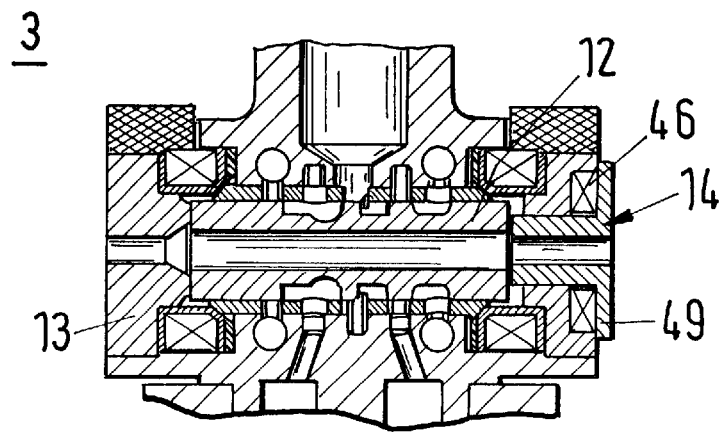

The injection process is controlled by the control valve 3 which is a solenoid valve in the illustrated embodiment. However, also other types of valves, for example, piezo valves, can be utilized as control valves. The control valve according to FIGS. 2 to 4 is provided with the opposite stop 14 to be axially adjustable in order to vary the displacement distance of the piston member depending on what the requirements are. A precise control of the injection with respect to timing and quantity is possible by means of the piston stroke. The opposite stop 14 is embodied as an anchor which is surrounded by a valve coil 46 provided within the valve body 6. The valve coil 46 is connected to the control unit 4. The opposite stop 14 has a socket portion 47 which is guided to be axially displaceable within a valve bore 48 of the valve body 6. The socket portion 47 is provided with a radially outwardly facing flange 49 at its end facing away from the piston 12.

In FIG. 2, the opposite stop 14 is positioned such that the piston 12 can perform a large stroke. The piston 12 is displaced in the described manner by the coils 10 or 11 in order to convey the hydraulic medium through the line 29 into the annular cavity 9, respectively, in order to relieve the annular cavity 9 to the tank. The stop 13 of the control valve 3 is axially fixedly connected to the valve body 6.

FIG. 3 shows the opposite stop 14 in its inwardly displaced position in which it abuts with its flange 49 the end face of the valve body 6. The socket portion 47 is inwardly displaced into the valve body 6 to such an extent that it is spaced only slightly from the piston 12. Thus, only a shortened piston stroke is available for the piston 12. For displacing the opposite stop 14, the valve coil 46 is provided with current, controlled by the control unit 4. The control valve 3 can be embodied such that the displaceable opposite stop 14 is continuously displaceable relative to the piston 12.

FIGS. 2 to 4 show the valve position in its opened stage. A varying opening diameter can be achieved by varying the position of the opposite stop 14 so that the valve can be excellently adjusted to the various requirements of pre-injection, main injection and subsequent injection. Furthermore, the response time of the control valve 3 is reduced by a shorter valve lift; this is also advantageous with respect to an improved control of the fuel amounts.

Figure 5:
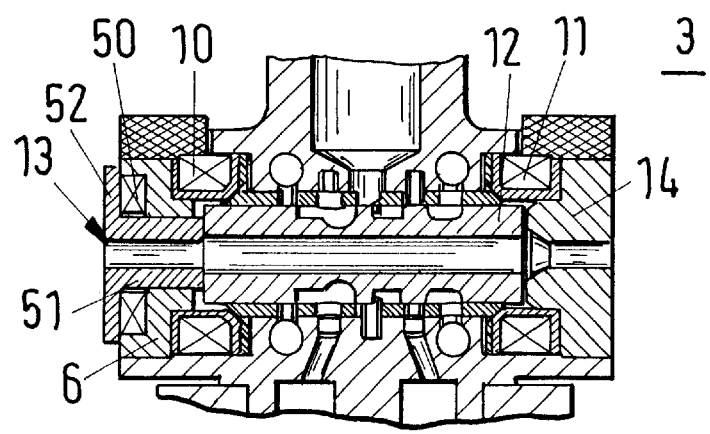

FIG. 5 shows a closed position of the control valve 3. Also in this closed position of the control valve 3, the position of the piston 12 can be changed. For this purpose, the stop 13 can be displaced by a coil 50 which is arranged in the valve body 6 and is also connected to the control unit 4. The stop 13 is also provided with a socket portion 51 having a radially outwardly facing flange 52 at one end face. By supplying the coil 50 with current, this stop 13 can be displaced into any desired position. The stop 13 can, for example, be shifted into a position in which the piston 12 creates a larger overlap of the valve control edges, thereby achieving a reduction of oil leakage. In order to avoid that the fuel injection is affected, the stop 13 can be displaced outwardly into its original position shortly before the injection starts.

In order to shift the piston 12 into different positions when the control valve 3 is closed off, only the stop 13 is provided to be axially displaceable. In contrast to the previous embodiment, the opposite stop 14 is fixedly connected; thus its position cannot be changed. In the resting position of the piston 12 and when the control valve 3 is closed off, the piston 12 is positioned at a distance from the opposite stop 14 so that the piston 12 can be displaced for the injection process into the direction of the opposite stop 14 to the extent desired by supplying the coils 10 or 11 with current.

Figure 6:
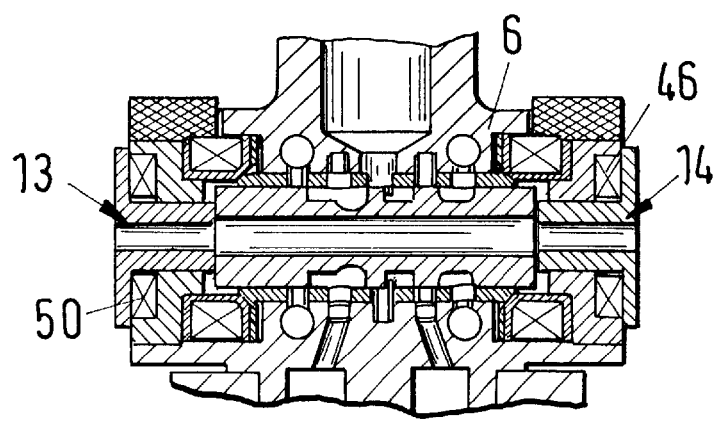
FIG. 6 show various embodiments of the control valve at various valve lift positions.

As is shown in FIG. 6, it is also possible, however, to provide both stops 13, 14 to be axially displaceable. In that event, the valve body 6 is provided with the two coils 46 and 50 by which the stops 13, 14 can be displaced to the desired extent. In this embodiment, a combination of the variation of the piston stop is, therefore, ensured when the control valve 3 is opened and when it is closed.

Figure 7:
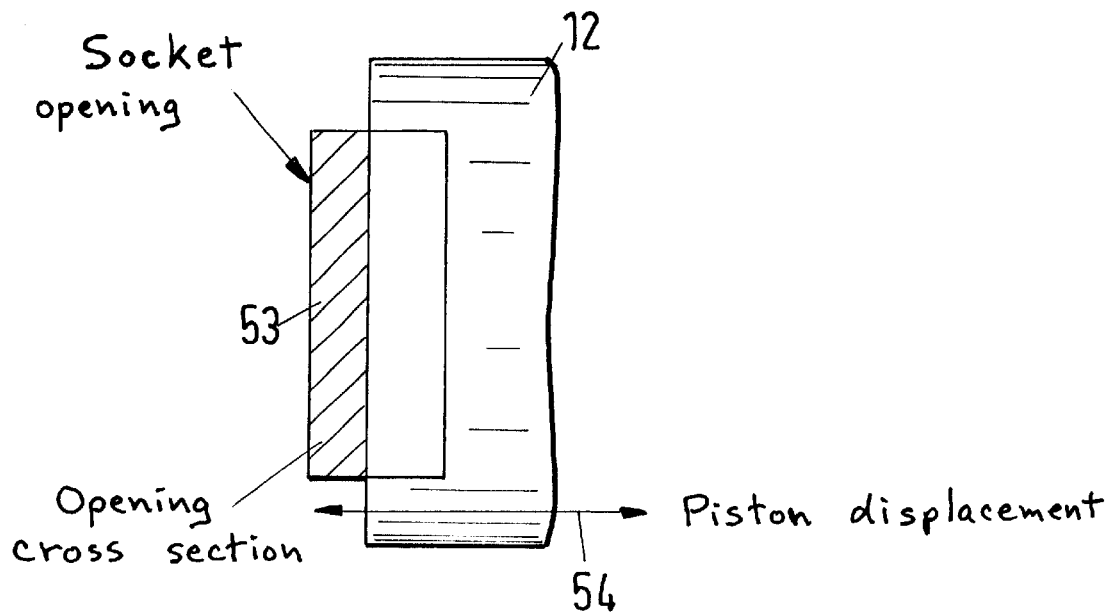
FIG. 7.

FIG. 7 shows a schematic view of a portion of the piston 12 of the control valve 3. A position of the piston 12 is illustrated in which it exposes an opening cross section 53 (hatched area) of a bore. This bore is provided with a constant width in the displacing direction 54 of the piston 12 so that the opening cross section 53 is constantly enlarged when the piston 12 is displaced. In such an embodiment, it is not possible to influence the travel-volume characteristic line of the control valve 3.

Figure 8:
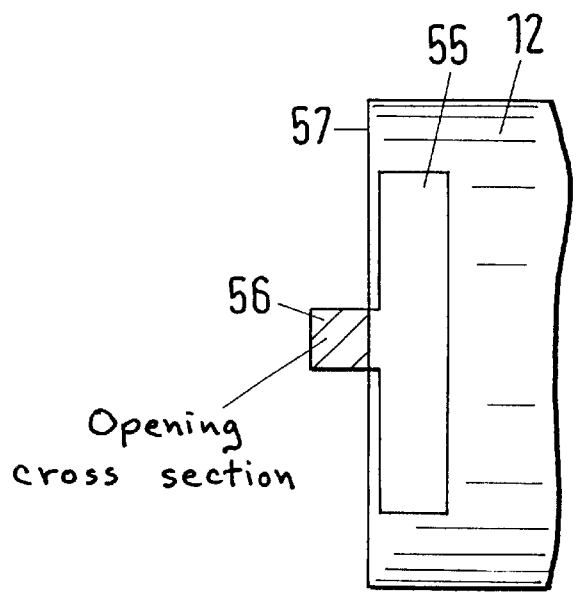
FIG. 8 show further embodiments of the control valve in simplified illustrations.

FIG. 8 illustrates the possibility to influence this characteristic line by a particular special design of the bore. It has a T-shaped cross section. If the piston 12 is located in the position illustrated in FIG. 8, it overlaps the wider portion 55 of the bore and only exposes the narrower opening cross section 56 (hatched area). Thereby, only a small quantity of hydraulic medium is initially conveyed. As soon as the control edge 57 of the piston 12 reaches the area of the significantly wider portion 55, the flow quantity of the hydraulic medium is immediately increased.

With the control valves 3 described herein, a control of the smallest injection quantities for the pre-injection and, if provided for, also for a subsequent injection is possible without having a negative impact on the main injection. By displacing the piston 12 when the control valve 3 is closed, leakage losses can be reduced. The stops can be adjusted irrespective of the type of valve employed. The stops can be continuously adjusted to reach any desired position so that the control valve 3 can be designed according to the most different requirements. The control valve described herein can be utilized in any area in which varying opening cross sections are required, e.g., in adjustment devices for cam shafts.

The specification incorporates by reference the disclosure of German priority document 199 16 658.7 of Apr. 14, 1999.

The present invention is, of course, in no way restricted to the specific disclosure of the specification and drawings, but also encompasses any modifications within the scope of the appended claims.

What is claimed is:

1. A control valve comprising:

a valve housing;

at least one piston displaceable within said housing; and stops provided within said housing for said at least one piston; wherein at least one of said stops is axially displaceable, wherein at least one of said stops is an anchor which is displaceable by a coil, and wherein said coil surrounds said at least one of said stop.

2. A control valve according to claim 1, wherein said at least one of said stop is provided with a socket portion by means of which it is guided within said valve housing.

3. A control valve according to claim 1, wherein said at least one of stops is provided at one end face with a radially projecting flange.

4. A control valve according to claim 1, wherein all of said stops are adjustable.

5. A control valve according to claim 2, wherein said coil surrounds said socket portion of said at least one of said stops.

6. A control valve according to claim 1, wherein at least one of said stops is continuously adjustable.

7. A control valve according to claim 3, wherein said flange is provided at an end face of said socket member that faces away from said piston.

8. A control valve according to claim 1, which includes a control unit for controlling displacement of at least one of said stops.

9. A control valve according to claim 4, wherein one of said stops is displaced for adjusting an overlap of valve control edges when said control valve is closed.

10. A control valve according to claim 4, wherein one of said stops is displaced for adjusting a flow cross section of a hydraulic medium when said control valve is opened.

11. A control valve according to claim 1, wherein a working connection is provided with a varying width in the displacing direction of said piston, wherein said varying width is provided for influencing a travel-volume characteristic line of said control valve.

* * * * *